Nov. 28, 1950 E. W. BREISCH ET AL 2,531,498
WAYSIDE STATION LINE COUPLING MEANS
FOR TRAIN COMMUNICATION SYSTEMS
Filed Feb. 20, 1947
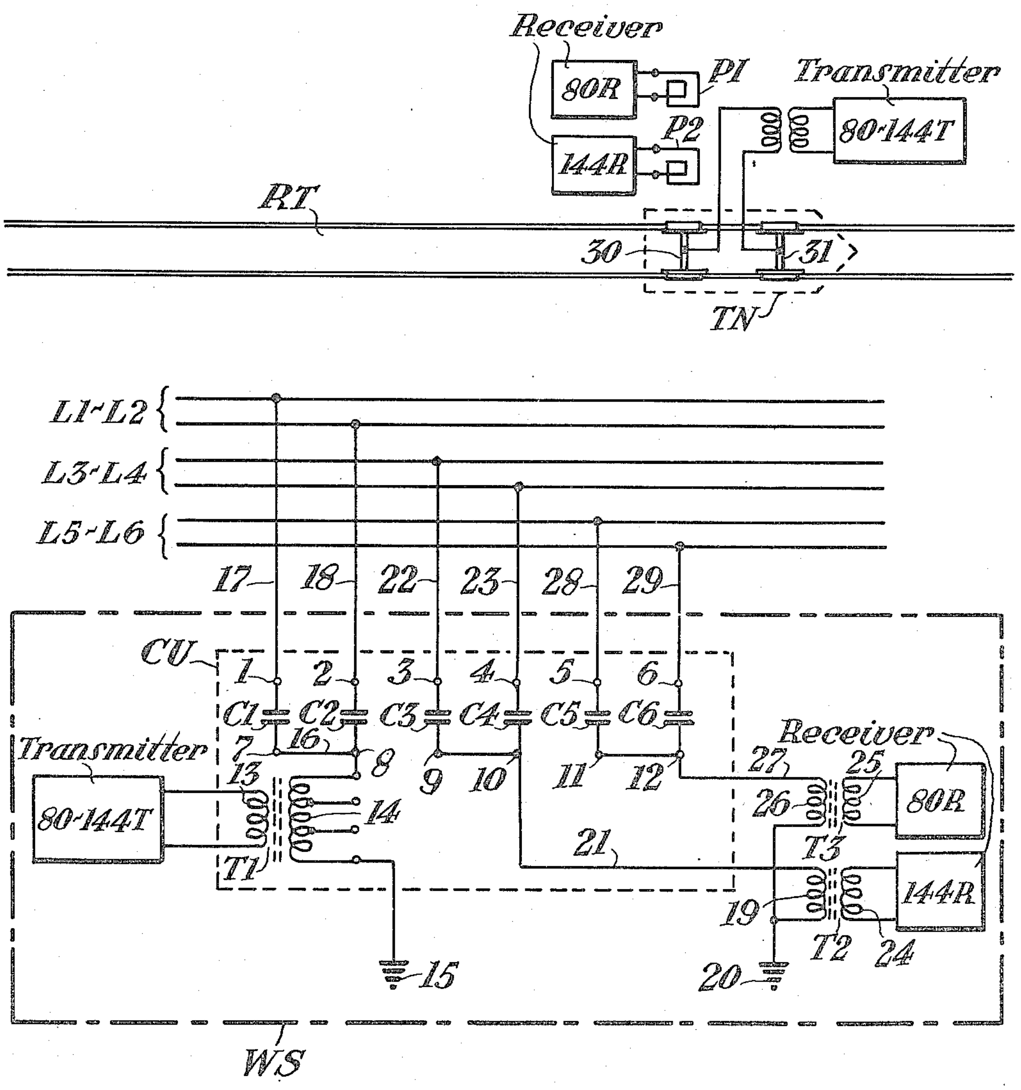
INVENTORS
Edgar W. Breisch, Robert G. Reed
and Lawrence R. Golladay
BY
THEIR ATTORNEY.

Patented Nov. 28, 1950

2,531,498

UNITED STATES PATENT OFFICE 2,531,498

WAYSIDE STATION LINE COUPLING MEANS FOR TRAIN COMMUNICATION SYSTEMS

Edgar W. Breisch, Edgewood, Robert G. Reed, Swissvale, and Lawrence R. Golladay, Forest Hills, Pa., assignors to The Union Switch and Signal Company, Swissvale, Pa., a corporation of Pennsylvania Application February 20, 1947, Serial No. 729,680

3 Claims. (Cl. 179—82)

Our invention relates to wayside station line coupling means for train communication systems, and more particularly to such line coupling means for inductive carrier communication systems for railway trains.

Inductive carrier communication systems for railway trains make use of a transmitting channel that includes conductors and line wires parallel to the track. The existing line wires strung on the pole line extending along the railway and used for telegraph and similar circuits become a part of the transmitting channel for such inductive carrier communication system due to the distributed capacitance of the line wires to ground and to their distributed mutual inductance to the track rails. This use of the line wires in a communication system is in addition to and without interference with their present use. That is, the longitudinal circuit formed by line wires due to their distributed capacitance to ground are elements of a channel with which circuit elements mounted on a train have inductive relation and energy can be inductively transferred between the wayside transmitting channel and the train.

These inductive carrier communication systems for railway trains generally provide telephone communication between wayside stations and the trains as well as between two vehicles of a train or between two different trains, and in providing communication between a wayside station and trains the station telephone equipment is generally coupled to the transmitting channel by being coupled to the longitudinal circuit of line wires extending along the railway. These train communication systems are usually of the simplex type in which the receiver is normally active ready to receive a telephone call or message and the transmitter is normally deenergized and is energized and made active only during the sending of a message.

Furthermore, such systems frequently provide two or more carrier frequency channels on each of which a two-way communication may be carried on, such a multiple channel system permitting a number of trains to use the system at the same time. A plurality of frequency channels also make it possible to provide a break-in feature by which a third party can break in on a conversation in case emergency train orders need to be transmitted without delay.

Again, the energy level of the transmitter of inductive carrier communication systems for railway trains is made relatively high because of the high attenuation of the current in the transmitting channel and in the relatively long air gap between the transmitting channel and the train carried elements. For the same reason, relatively high gain receivers are required. Due to the high energy level of the transmitter, some arrangement must be provided to assure that the output of a transmitter of a station does not swamp the input of the receiver at the same station. It is common practice to desensitize the local receiver during sending periods by removal of the anode voltage of one or more electron tubes of the intermediate stages of the receiver, but the input of the first stage of the receiver remains closed. This condition of the first stage of the receiver may result in the input circuits being charged due to the high energy level of the local transmitter and such charges on the receiver input must be dissipated before the receiver can function at its normal sensitivity.

In view of the foregoing requisites for inductive train communication systems for railway trains, a main object of our invention is the provision of improved means for coupling the telephone equipment of a wayside station of an inductive carrier communication system for railway trains to line wires.

A feature of our invention is the provision of novel coupling means for connecting a wayside station transmitter and receiver of a multiple channel inductive communication system to different line wires paralleling the railway.

Other features, objects and advantages of our invention will appear as the specification progresses.

The foregoing objects, features and advantages of our invention are attained by the provision of a novel circuit network for connecting the transmitter output and the input of each receiver of a wayside telephone equipment to individual pairs of line wires.

For a better understanding of our invention, reference may be had to the accompanying drawing, which is a diagrammatic view showing one form of apparatus embodying our invention when used with a two frequency channel inductive carrier communication system for railway trains.

It is to be understood that the invention is not limited to a two frequency channel system and this application illustrates the many places the apparatus is useful.

Referring to the drawing, the reference character RT designates a track of a railway which is provided with an inductive carrier communication system. The railway may be a single track road, or it may be a multiple road of which the track RT is one track. The inductive carrier system may take different forms and may be similar to the two frequency channel system disclosed in an application for Letters Patent of the United States Serial No. 575,311, filed January 30, 1945, by Paul N. Bossart, for Railway Train Communication and Alarm System Using Modulated Carrier Currents, now Patent No. 2,484,680, issued October 11, 1949, or it may be similar to the apparatus disclosed in Letters Patent of the United States No. 2,064,639, granted December 15, 1936, to Leland D. Whitelock et al., for Communication Systems.

A train is indicated conventionally at TN and a dot and dash rectangle WS indicates a wayside station of the railway. Both the train and the station are provided with telephone equipment of the train communication system so that an operator at the station WS can communicate with train TN while it is moving over the track RT. The telephone equipments of the station and train would be similar and they are shown as being of the two channel arrangement disclosed in the aforementioned Bossart application and each equipment comprises two receivers shown conventionally by the reference characters 80R and 144R and a transmitter disclosed conventionally by the reference character 80—144T.

It is sufficient for the present application to point out that the receiver 80R includes an amplifier, a demodulator and a telephone receiver for reproducing the voice frequencies of a frequency modulated current having a carrier frequency of the order of, say 80 kc. Similarly, the receiver 144R includes an amplifier, a demodulator and a telephone receiver to reproduce the voice frequencies of a frequency modulated carrier current of a carrier of the order of, say 144 kc. These two carriers, 80 kc. and 144 kc., constitute a first and a second frequency channel, respectively, for the train communication system. The transmitter 80—144T includes a modulator, an oscillator and a power amplifier to supply a frequency modulated carrier telephone current of either the two channel frequency 80 kc. or 144 kc. It is to be understood that the invention is not limited to these carrier frequencies and other frequencies can be used.

On the train TN the receivers 80R and 144R are connected to pick-up coils P1 and P2, respectively, which are mounted on the train to have inductive relation with a wayside transmitting channel that includes the line wires and other conductors extending along the railway parallel to the track. The train transmitter 80—144T is connected to a sending loop circuit which as here shown includes two spaced pairs of wheels 30 and 31 of the train and the track rails between these pairs of wheels, and which sending loop circuit is arranged for inductive relationship to the wayside transmitting channel. The coupling of the station receivers and transmitter of the telephone equipment to the transmitting channel will appear shortly.

The reference characters L1 to L6, inclusive designate line wires which extend along the railway. Ordinarily, the line wires L1 to L6 would be existing line wires strung on the usual pole line along the railway right-of-way so that the wires are approximately parallel to and reasonably close to the track RT. In the drawing only a short portion of each line wire is illustrated for the sake of simplicity, but it is to be understood that these line wires would extend for substantially the full length of the track equipment for train communication. These line wires L1 to L6 would be those usually used for telegraph, signal and similar purposes, and as shown the line wires L1 and L2 are indicated as a pair forming a first transverse line circuit, line wires L3 and L4 are indicated as a pair forming a second transverse line circuit, and line wires L5 and L6 as forming a third transverse line circuit.

As explained herein, each of these line wires L1 to L6 is a part of a transmitting channel of the train communication system due to the distributed capacitance of the line wires to ground and their distributed inductance to the rails of the track. In other words, the longitudinal circuit formed by each line wire, or better still, the longitudinal circuit formed by each pair of line wires in multiple, is a part of the transmitting channel of the train communication system, and with which transmitting channel the train carried circuits are mounted for inductive relation so that energy of the train communication system is effectively transmitted between the train and points remote from the train.

To provide two-way communication between the station WS and train TN, the telephone equipment at the station is coupled to the line wires. This coupling means includes a coupling unit indicated as a whole by a dotted rectangle CU and by which coupling unit the transmitter and receivers of the station equipment are connected to the line wires in a novel manner. The coupling unit CU is provided with two rows of terminals 1 to 6, inclusive, and 7 to 12, inclusive, the terminals being arranged in pairs as will be apparent from an inspection of the drawing. A capacitor is connected between the terminals of each pair. For example, a capacitor C1 is connected between the pair of terminals 1 and 7. The unit CU also includes an output transformer T1 which is provided with a primary winding 13 connected to the output of a transmitter 80—144T and with a secondary winding 14 connected between the line wires L1 and L2 and a ground electrode 15. To be specific, the lower terminal of secondary winding 14 as viewed in the drawing, is connected to the ground electrode 15 and the top terminal of secondary winding 14 is connected to the line wire L1 through terminal 8, connector 16 between terminals 7 and 8, capacitor C1, terminal 1 and wire 17; and is connected to line wire L2 through terminal 8, capacitor C2, terminal 2 and wire 18. That is, the output of the transmitter is coupled to the longitudinal circuit formed by the two line wires L1 and L2 of the first transverse line circuit. Preferably the secondary winding 14 is provided with intermediate terminals to permit impedance matching of the transmitter output with the line circuit.

The input of receiver 144R is coupled to the longitudinal circuit formed by the line wires L3 and L4, through an input transformer T2 and the coupling unit CU. Transformer T2 is provided with a secondary winding 24 connected to the input of the receiver 144R and with a primary winding 19 having one terminal connected to a ground electrode 20 and its other terminal connected to the line wires L3 and L4 in multiple, one path of the connection including wire 21, connection between terminals 9 and 10, capacitor C3, terminal 3 and wire 22 connected to line wire L3; and the other path including wire 21, terminal 10, capacitor C4, terminal 4 and wire 23 connected to line wire L4. Similarly, the receiver 80R is coupled to the longitudinal circuit formed by the line wires L5 and L6, the connection being completed through an input transformer T3 and the unit CU. A secondary winding 25 of transformer T3 is connected to the input of the receiver and a primary winding 26 of the transformer has one terminal connected to ground electrode 20 and its other terminal connected to the line wires L5 and L6 in multiple through two paths, one path including wire 27, a connector between terminals 12 and 11, capacitor C6 and wire 28 connected to line wire L5; and the other path including wire 27, terminal 12, capacitor C6, terminal 6 and wire 29 connected to line wire L6.

It follows that communication current transferred from the train carried transmitter to the wayside transmitting channel will be applied to the inputs of the two receivers 80R and 144R at the station WS, due to the coupling of the receivers to the line wires, the receiver 80R being effectively responsive when the communication current is of the 80 kc. channel and the receiver 144R being effectively responsive when the communication current is of the 144 kc. channel. Furthermore, when the wayside station transmitter is made active to supply current of either the 80 kc. channel or of the 144 kc. channel to the transmitting channel along the railway, the train carried receivers will be selectively responsive to this current due to their coupling to the transmitting channel.

As explained in the aforementioned Bossart application, the telephone equipment is arranged so that when the transmitter of the wayside station is conditioned for sending on the 80 kc. channel, the receiver 144R remains active but the 80R receiver is desensitized by the opening of the anode circuits of electron tubes used in that receiver. Also, when the transmitter is conditioned to send on the 144 kc. channel, the receiver 80R remains active but the 144R receiver is desensitized by opening the anode circuits of electron tubes used in that receiver. In either case, the input of the first stage of each receiver remains closed. With the coupling network here provided it is clear that when the transmitter of the wayside station is sending on the 80 kc. channel, the electromotive force applied to the input of the local receiver 80R is only that created on the line wires L3 and L4 due to the distributed inductance of these line wires to the longitudinal circuit formed by the line wires L1 and L2, and this electromotive force will be relatively low compared to the output voltage of the transmitter which would be applied to the receiver were both the transmitter and receiver coupled to the same pair of line wires as has been the practice heretofore. Also, the electromotive force of the 80 kc. channel applied to the receiver 144R is relatively low when the transmitter is sending on the 80 kc. channel and a relatively simple filter arrangement can be used, whereas if the 144R receiver were coupled to the same line wires as the transmitter, arrangements must be provided so that the relatively high energy level of the output of the transmitter does not swamp the input of the active receiver. Again, when the transmitter is sending on the 144 kc. channel, the electromotive force applied to the input of the 144R receiver is relatively low and only that created on the line wires L5 and L6 due to their distributed inductance and capacitance to the longitudinal circuit formed by the line wires L1 and L2. Also, the electromotive force applied to the active receiver 80R due to the energy supplied by the transmitter at this time would be relatively low.

It is pointed out that in the case only four line wires are available then the input of each receiver would be preferably coupled to one wire of a pair of the line wires while the transmitter is coupled to the second pair of the line wires.

We have found that the coupling network here provided greatly improves communication between a wayside station and trains. Also, that the noise to signal ratio is greatly reduced and minimized when each receiver is coupled to both wires of the same pair of line wires.

Line coupling means such as here provided has the advantages that it is of compact design so that it can be mounted to permit any suitable location of the wayside station apparatus and in a location most convenient for the line wire connection. The adjustable secondary of the output transformer T1 permits sufficient impedance matching of the standard transmitter to the line wires of any existing telephone or telegraph line circuit. High voltage coupling capacitors are an integral part of the coupling unit, and the coupling means can be arranged to take advantage of telephone line transposition characteristics.

Although we have herein shown and described but one form of wayside station line coupling means for train communication systems embodying our invention, it is understood that various changes and modifications may be made therein within the scope of the appended claims without departing from the spirit and scope of our invention.

Having thus described our invention, what we claim is:

1. In a simplex inductive carrier railway train communication system which uses the existing line wires strung on the usual pole line along a railway right-of-way as a transmitting channel due to the distributed impedance of the line wires to ground and the distributed mutual inductance of the line wires and to which channel train carried circuit elements are mounted for inductive relation thereto, the combination comprising, a transmitter and a receiver of carrier communication current located at a given wayside station, a plurality of paralleling line wires which form for their entire length a transmitting channel for carrier current due to the distributed impedance of the separate line wires to ground and due to the distributed mutual inductance of the line wires because of their parallel relationship, an output and an input transformer each of which is provided with a primary and a secondary winding, said primary winding of said output transformer connected to said transmitter and said secondary winding of said input transformer connected to said receiver, a first circuit including said secondary winding of said output transformer and a blocking capacitor in series connected between a selected one of said plurality of line wires and ground, and a second circuit including said primary winding of said input transformer and another blocking capacitor in series connected between a different selected one of said plurality of line wires and ground.

2. In a two-way inductive carrier railway train communication system which uses the existing line wires strung on the usual pole line along a railway right-of-way as a transmitting channel due to the distributed impedance of the line wires to ground and the distributed mutual inductance of the line wires and which line wires are used in their existing line circuits in pairs with each pair forming a transverse line circuit, the combination comprising, carrier communication current equipment including transmitting apparatus and receiving apparatus and located at a given wayside station, said transmitting apparatus including a carrier transmitter and an output transformer, said receiving apparatus including a carrier receiver and an input transformer, each of said transformers provided with a primary and a secondary winding, said primary winding of said output transformer being connected to said transmitter, said secondary winding of said input transformer being connected to said receiver, a plurality of pairs of line wires, said line wires having a parallel relationship and forming for their entire length a transmitting channel for carrier current due to their distributed impedance to ground and their distributed mutual inductance as provided by their parallel relationship, a first pair of capacitors in series connected across a first selected pair of said plurality of pairs of wires, said secondary winding of said output transformer connected between the junction terminal of said first pair of capacitors and ground, a second pair of capacitors in series connected across a second selected pair of said plurality of pairs of wires, and said primary winding of said input transformer connected between the junction terminal of said second pair of capacitors and ground.

3. In combination, a railway track, a plurality of paralleling line wires extending along said track and forming a transmitting channel for carrier communication current due to their distributed impedance to ground and their distributed inductance with each other, a train carried communication equipment having circuit elements mounted for inductive relation with said line wires, a wayside communication equipment including a carrier transmitter and a carrier receiver of carrier communication current and located along said track and having an output and an input transformer each of which is provided with a primary and a secondary winding, said primary winding of said output transformer connected to said transmitter to be supplied with communication current, said secondary winding of said input transformer connected to said receiver for supplying communication current thereto, a first circuit including said secondary winding of said output transformer connected between a selected one of said line wires and ground for transmission of communication current from said wayside equipment to said train carried equipments due to said transmitting channel, and a second circuit including said primary winding of said input transformer connected between a second selected one of said line wires and ground for transmission of communication current from the train carried equipment to the wayside equipment due to said transmitting channel.

EDGAR W. BREISCH.
ROBERT G. REED.
LAWRENCE R. GOLLADAY.

REFERENCES CITED

The following references are of record in the file of this patent:

UNITED STATES PATENTS

| Number | Name | Date |
|---|---|---|
| 1,683,716 | Espenchied | Sept. 11, 1928 |
| 1,815,976 | Green | July 28, 1931 |
| 2,064,641 | Bossart | Dec. 15, 1936 |
| 2,064,642 | Bossart | Dec. 15, 1936 |
| 2,124,450 | Shaver | July 19, 1938 |
| 2,240,676 | Shaver | May 6, 1941 |
| 2,310,060 | Booth | Feb. 2, 1943 |
| 2,310,097 | Langguth et al. | Feb. 2, 1943 |
| 2,393,291 | Clark | Jan. 22, 1946 |